(12) United States Patent
Dilley et al.

(10) Patent No.: US 9,045,019 B2
(45) Date of Patent: Jun. 2, 2015

(54) ROOF HVAC OUTLET

(75) Inventors: Jason Dilley, Marysville, OH (US);
Ruben E. Guanzon, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1009 days.

(21) Appl. No.: 13/049,991

(22) Filed: Mar. 17, 2011

(65) Prior Publication Data

US 2012/0235444 A1    Sep. 20, 2012

(51) Int. Cl.
| | |
|---|---|
| *B60H 1/00* | (2006.01) |
| *B60H 1/26* | (2006.01) |
| *B60R 13/07* | (2006.01) |
| *B62D 25/06* | (2006.01) |
| *B62D 25/07* | (2006.01) |
| *B60H 1/24* | (2006.01) |

(52) U.S. Cl.
CPC ............ *B60H 1/245* (2013.01); *Y10T 29/49826* (2015.01); *B60H 1/00564* (2013.01)

(58) Field of Classification Search
CPC ...... B60H 1/0027; B60H 1/245; B60H 1/242; B60J 7/00; B60R 13/01

USPC .......................................................... 454/137
See application file for complete search history.

(56) References Cited

U.S. PATENT DOCUMENTS

| | | | |
|---|---|---|---|
| 4,142,227 A | 2/1979 | Aikens | |
| 4,252,053 A | 2/1981 | Muto et al. | |
| 6,315,354 B1 * | 11/2001 | Tani et al. | 296/208 |
| 6,616,523 B1 | 9/2003 | Tani et al. | |
| 6,749,255 B2 * | 6/2004 | Dykman et al. | 296/214 |
| 2005/0202774 A1 | 9/2005 | Lipke | |
| 2011/0248258 A1 * | 10/2011 | Kim et al. | 257/43 |

* cited by examiner

*Primary Examiner* — Steven B McAllister
*Assistant Examiner* — Helena Kosanovic
(74) *Attorney, Agent, or Firm* — Rankin, Hill & Clark LLP

(57) ABSTRACT

An HVAC assembly for a vehicle includes a roof liner with an opening, and a stiffener. The stiffener includes an upper surface, a lower surface, and an integrally formed HVAC duct extending away from the unexposed side of the roof liner toward the roof of the vehicle. The lower surface of the stiffener contacts an unexposed side of the roof liner, and at least substantially surrounds the opening for providing rigidity to the roof liner around the opening in the roof liner. The integrally formed HVAC duct includes an outlet port for providing conditioned air to the vehicle cabin.

4 Claims, 4 Drawing Sheets

ROOF HVAC OUTLET

BACKGROUND

Exemplary embodiments herein relate to roof HVAC outlets.

As vehicles become more advanced, there is a desire to increase the comfort and convenience that is provided to the occupants of the vehicle. To accomplish this, heating and air conditioning outlets may be individually supplied to mid-row or rear seat occupants. Also, to further increase the occupants' comfort, electronic devices can be individually provided to the occupants. These electronic devices may include a lamp for illumination, and/or something more complex, such as a control device for the heating and air conditioning or a personal entertainment station.

To supply this individualized comfort and convenience to the vehicle occupants, various structures can be located in the vehicle roof. This can be accomplished by supplying holes in the vehicle roof liner to house the various structures. For example, a first structure is typically provided to house the individualized heating and air conditioning outlets and a second structure is usually provided to house the electronic device. Wire harness clips may be glued to the backside of the roof liner to secure the wire harness that provides power to the electronic device.

Unfortunately, as the number of housings is increased, the cost of the vehicle increases and the potential for increased tolerance stack-up is likely. Further, by providing the holes in the roof liner, the structural rigidity of the roof liner is dramatically reduced. This may cause sagging of the roof liner and/or appearance defects. Additionally, as the various structures are increased in size to accommodate additional features, they also have a tendency to become less rigid, further contributing to appearance defects and can even result in early device failure. In an attempt to address this defect, each of these structures may be attached to a separate stiffener that is attached to the roof lining. However this increases the number of stiffeners that must be used.

Finally, as the individualized heating and air conditioning outlets and the electronic device are separate components and each requires its own housing, there are an increased number of operations required to install the components into the vehicle, which translates into increased labor costs. As such, vehicle assembly and the related inventory management is further complicated.

SUMMARY

An HVAC assembly that can overcome at least some of the aforementioned shortcomings includes a roof liner including an exposed side that faces toward a cabin of the vehicle and an unexposed side that faces toward a roof of the vehicle. The roof liner includes an opening formed therethrough. The HVAC assembly also includes a stiffener including an upper surface, a lower surface, and an integrally formed HVAC duct extending away from the unexposed side of the roof liner toward the roof of the vehicle. The lower surface of the stiffener connects with the roof liner and contacts the unexposed side of the roof liner and at least substantially surrounds the opening for providing rigidity to the roof liner around the opening in the roof liner. The integrally formed HVAC duct includes an outlet port for providing conditioned air to the cabin of the vehicle.

According to another aspect, an HVAC outlet device for attaching between a roof and a roof liner of a vehicle includes a stiffener including a base, an integrally formed HVAC duct, and an electronic device opening. The base has an upper surface and a lower surface and the HVAC duct extends away from the upper surface toward the roof of the vehicle. The electronic device opening is offset from the HVAC duct in at least one of a lateral direction and a longitudinal direction of the vehicle. The HVAC outlet device also includes a wire holder for retaining a wire harness and is connected to the stiffener.

According to still another aspect, a method of assembling an HVAC outlet device in a vehicle roof includes attaching a stiffener to an unexposed side of a roof liner in a vehicle. The stiffener includes an integrally formed HVAC duct. The method further includes aligning an inlet port of the HVAC duct to a roof supply duct in the vehicle roof to allow fluid communication between the roof supply duct and the HVAC duct.

DETAILED DESCRIPTION

Figure 1:
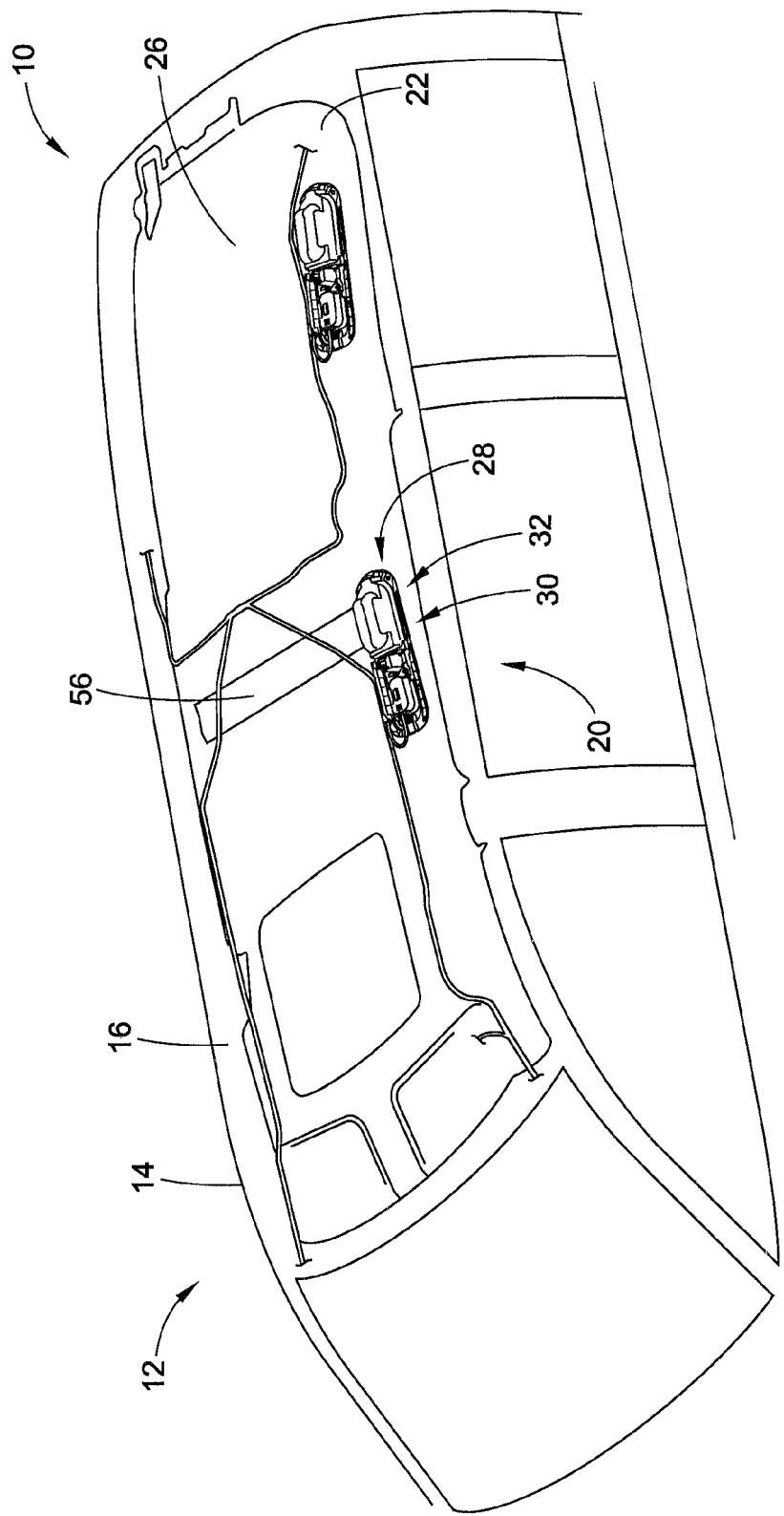
FIG. 1 is a perspective view of a vehicle including a HVAC assembly with an HVAC outlet device.

Referring now to the drawings, wherein they are for purposes of illustrating one or more exemplary embodiments and not for purposes of limiting same, FIGS. 1-4 illustrate the HVAC assembly 10 for a vehicle 12, only a portion of which is shown in FIG. 1.

Figure 3:
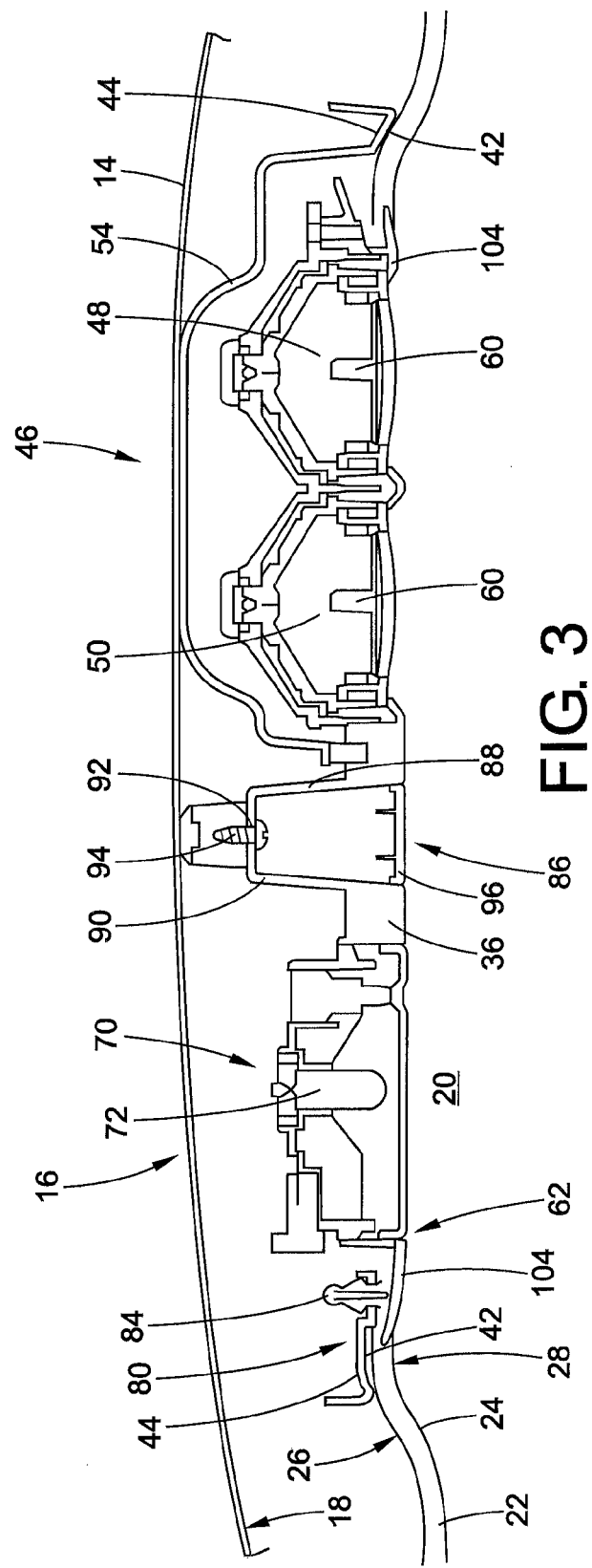
FIG. 3 is a sectional view of the HVAC outlet device along line 3-3 of FIG. 2 with the roof of the vehicle included for reference.

As shown by FIGS. 1 and 3, a roof 14 extends in a lateral and longitudinal direction of the vehicle 12. As illustrated in FIG. 1, a majority of the roof 14 is shown as transparent to allow for viewing of the components. Typically, roofs are made of a ferrous material that provides structural rigidity to the vehicle 12. However, other materials such as aluminum or composites are possible and contemplated. While the roof 14 is illustrated as being generally rectangular shaped, it is understood that other shapes are envisioned. The roof 14 includes an exterior side 16 that faces toward the atmosphere and an interior side 18 that faces toward an interior cabin 20 of the vehicle 12.

A roof liner 22 extends in the lateral and longitudinal directions along the roof 14 and can provide a finished surface of the interior cabin 20. Roof liners may be made of generally rigid materials, although the materials from which the roof liner is made are typically not as rigid as the roof 14. The roof liner 22 may be finished with textile materials that offer an aesthetically pleasing surface to provide a finished look for the interior cabin 20. The roof liner 22 may alternatively be made of composite or organic materials.

With reference to FIG. 3, the roof liner 22 includes an exposed side 24 that faces toward the interior cabin 20 of the vehicle 12 where an occupant would be situated, and an unexposed side 26 that faces toward the roof 14, or away from the interior cabin 20. The roof liner 22 further includes an opening 28 for receipt of an HVAC outlet device 30 including a stiffener 32 and a wire holder 34 as will described below.

As illustrated, the opening 28 and the HVAC outlet device 30 are shown near a lateral edge of the roof 14 and the roof liner 22. However, it is understood that the opening 28 and the HVAC outlet device 30 could be disposed in a variety of locations of the roof 14 and roof liner 22. Furthermore, FIG. 1 illustrates a plurality of HVAC outlet devices 30. However for clarity, only one of the HVAC outlet devices 30 will be numbered with detail, but it is further understood that the description applies to each HVAC outlet device 30.

Figure 2:
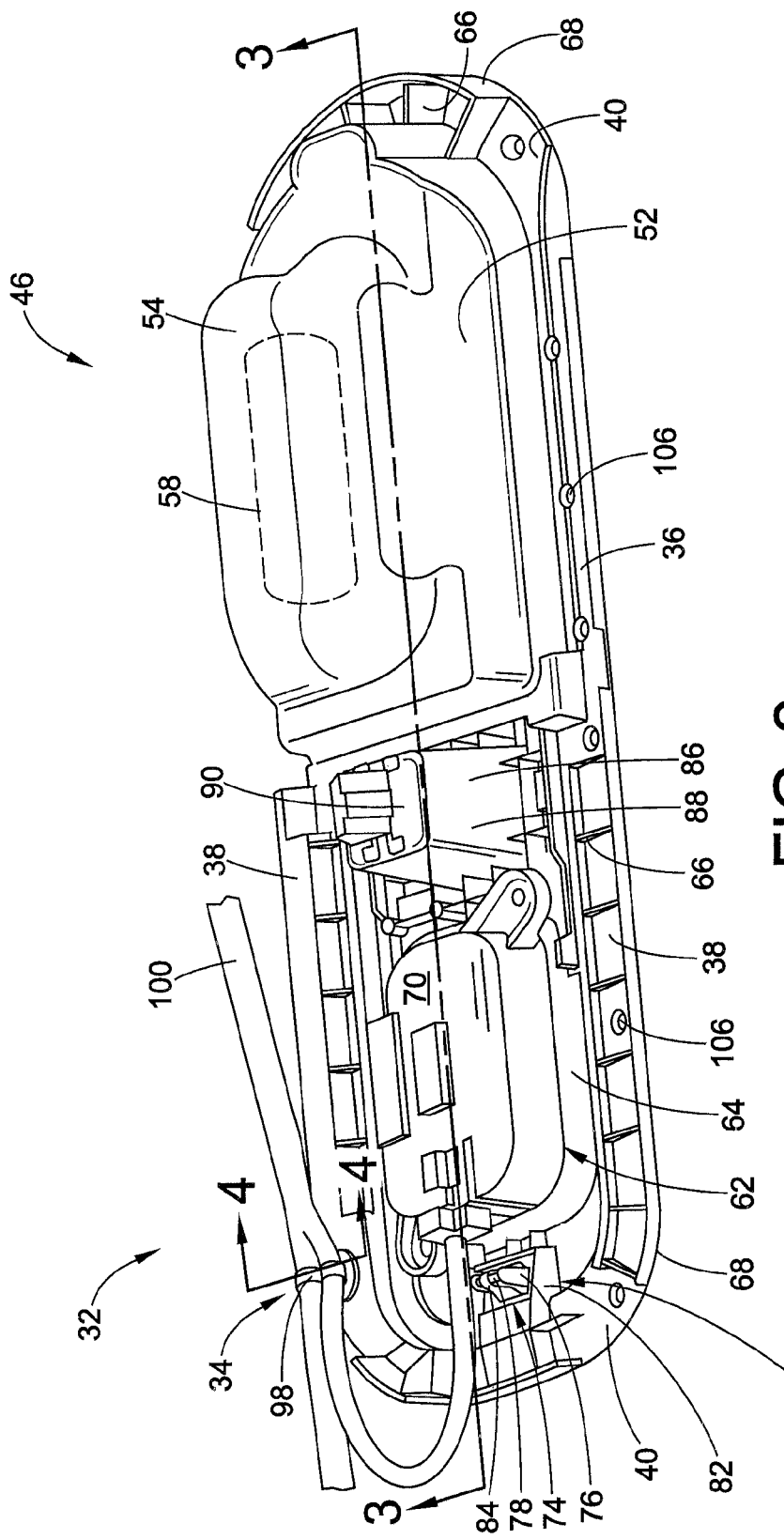
FIG. 2 is a perspective view of the HVAC outlet device shown in FIG. 1.

With reference to FIGS. 1-3, the stiffener 32 surrounds the opening 28 in the roof liner 22 and may include a base 36 with linear sections 38. The linear sections 38 can be connected by curved sections 40 to form an obround shape. With reference to FIG. 3, the stiffener 32 includes a lower surface 42 that contacts the unexposed side 26 of the roof liner 22 and an upper surface 44 from which an HVAC duct 46 extends away.

The stiffener 32 may be made of a variety of materials, such as hard plastic having sufficient rigidity to hold a given shape. The stiffener 32 substantially surrounds the opening 28 in the roof liner 22, thereby greatly increasing the rigidity of the roof liner 22 adjacent the opening 28. The stiffener 32, and especially the base 36, provide strength to the HVAC outlet device 30 so that conditioned air may be supplied to the occupant without the addition of a separate stiffener.

Disposed near one end of the stiffener 32 is the HVAC duct 46. The HVAC duct 46 is integrally formed in the stiffener 32, i.e. the stiffener 32 and the HVAC duct 46 can be integrally formed via a single molding operation. The HVAC duct 46 includes a first outlet port 48 and a second outlet port 50, as illustrated in FIG. 3. Sides 52 of the HVAC duct 46 extend away from the unexposed side 26 of the roof liner 22 toward the roof 14 and transition into a curved top surface 54 of the HVAC duct 46. The curved top surface 54 of the HVAC duct 46 may contact the roof 14 of the vehicle 12, thereby further increasing the structural stability of the HVAC assembly 10, including the roof liner 22.

With reference back to FIG. 1, the HVAC duct 46 can receive conditioned air from a roof supply duct 56 via an inlet port 58 (shown in phantom in FIG. 2) that may be located laterally inward or medial with respect to the stiffener 32. The roof supply duct 56 can receive air from a fan (not shown). The air can be conditioned to match the occupant's preferences, as is known in the art. The inlet port 58 may be attached to an individual roof supply duct or multiple roof supply ducts. If multiple roof supply ducts are connected to the inlet port 58, the airstreams may be kept separate to supply unique airstreams via the first and second outlet ports 48, 50 or the airstreams from the multiple roof supply ducts may be blended together to supply a combined airstream to the first and second outlet ports 48, 50.

The first and second outlet ports 48, 50 are located within the HVAC duct 46 and provide conditioned air to the occupant. The first and second outlet ports 48, 50 may include dampers 60 to limit the quantity of the air exiting the first and second outlet ports 48, 50. As shown in FIG. 3, the second outlet port 50 is laterally located between the first outlet port 48 and an electronic device opening 62.

With continued reference to FIG. 3, the electronic device opening 62 is disposed near an end opposite the HVAC duct 46 and is defined by a bezel 64 (FIG. 2) that is inset from the base 36 of the stiffener 32. The bezel 64, which defines the electronic device opening 62, can be integrally formed with the stiffener 32 and the HVAC duct 46. The electronic device opening 62 may be obround or rectangular shaped to complement the shape of an electronic device 70 for proper receipt, as will be discussed hereinbelow. The bezel 64 further reinforces the stiffener 32 to compensate for the lack of material due to the electronic device opening 62. The electronic device opening 62 is offset from the HVAC duct 46 in at least one of a lateral direction and a longitudinal direction of the vehicle 12.

As illustrated, the electronic device 70 is a lamp 72 that may be used for illumination and can be rectangular shaped. This shape complements the electronic device opening 62 and reduces any gap between the electronic device 70 and the electronic device opening 62 to provide a better design surface. However, it is understood that the electronic device 70 could be a device more complex than a lamp 72, such as a control for the HVAC system or a personal entertainment station.

As mentioned hereinbefore, the electronic device opening 62 is offset from the HVAC duct 46 in at least one of a lateral direction and a longitudinal direction of the vehicle 12. By offsetting the electronic device opening 62, the electronic device 70 can be spaced from the HVAC duct 46. This allows the occupant to be directly cooled with the conditioned air from the HVAC duct 46, but spaces the lamp 72 to an area in front of the occupant so that no shadows are created by the occupant from illumination of the lamp 72. Alternatively, if the electronic device 70 is a control for the HVAC system or a personal entertainment station, the occupant will still be directly cooled and the occupant will have easier access to the HVAC control system or personal entertainment station since it will be located slightly forward of the occupant.

With reference back to FIG. 2, the electronic device 70 may include a connection part 74 with arms 76 that extend toward the roof 14 and that are united by a joining member 78. The connection part 74 interacts with an outlet attachment 80 to secure the electronic device 70 in the stiffener 32.

The outlet attachment 80 is disposed near the electronic device opening 62 and extends toward the HVAC duct 46. The outlet attachment 80 can be a square-walled or ring-shaped yoke 82 with an opening that receives the connection part 74 of the electronic device 70. Specifically, the arms 76 can extend through the opening of the yoke 82 so the joining member 78 receives a friction clip 84.

The friction clip 84 has an inverted V-shape and is constructed of a resilient material for providing resistance when compressed. The connection part 74 of the electronic device 70 cooperates with the friction clip 84 to exert outward pressure on the yoke 82 to prevent withdrawal of the connection part 74 of the electronic device 70 from the yoke 82, thereby ensuring retention of the electronic device 70 within the stiffener 32. Specifically, the friction clip 84 retains the joining member 78 within an inner part of the V shape, while an outer part of the friction clip frictionally engages the yoke 82. The pressure exerted by the friction clip 84 may be in the longitudinal direction to aid in initial insertion of the electronic device 70 into the electronic device opening 62, thereby simplifying assembly of the vehicle 12.

A stiffener connector 86 may be laterally located between the electronic device opening 62 and the HVAC duct 46. The stiffener connector 86 can include at least one sidewall 88 that extends from the base 36 toward the roof 14. The at least one sidewall 88 cooperates with a base wall 90 to define a cavity 91. An aperture 92 extends through the base wall 90 to allow for the passage of a fastener 94 for attachment of the stiffener 32 to the vehicle 12.

A cover 96 may be utilized to prevent access to the cavity 91 and limit exposure of the fastener 94 to the interior cabin 20. As mentioned hereinbefore, the second outlet port 50 can be laterally located between the first outlet port 48 and the electronic device opening 62. More specifically though, the second outlet port 50 can be laterally disposed between the first outlet port 48 and the stiffener connector 86.

With reference back to FIG. 2, ribs 66 may extend between a raised perimeter 68 of the base 36 and the electronic device opening 62, as well as the HVAC duct 46, thereby further increasing the rigidity of the stiffener 32. Although illustrated as decreasing in height when extending from the electronic device opening 62 to the raised perimeter 68, it is understood that the ribs 66 could alternatively have a constant height or increase in height.

Figure 4:
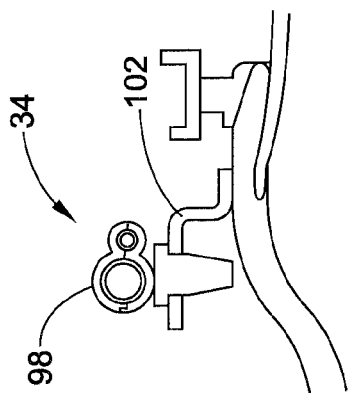
FIG. 4 is a sectional view of the HVAC outlet device along line 4-4 of FIG. 2.

With specific reference to FIGS. 2-4, the wire holder 34 is located near the end opposite the HVAC duct 46. The wire holder 34 includes at least one ring 98 for receipt of a wire harness 100 and a post 102 for attachment of the wire holder 34 to the stiffener 32. Although the ring 98 is illustrated as being of closed form, it is understood that the ring 98 could instead be of a semi-circular or U-shape open form. The wire holder 34 may be made of a variety of materials, such as hard plastic having sufficient rigidity to hold a given shape. The wire holder 34 is shown of modular construction, but can be single piece construction. The wire holder 34 can accept different diameter wire harnesses that are to be retained.

The wire harness 100 can be any known wire harness, and wire harnesses are well-known in the art. The wire harness 100 can be a conventional wire harness used in automotive construction, in which the wire harness may have a substantially circular shape. The wire harness 100 can have a uniform shape and dimension throughout the longitudinal length of the wire harness. The wire harness 100 supplies electrical power, as is well known, from a source to a variety of electrical devices in the vehicle 12. In many cases, the wiring harness has a generally circular cross-section.

With reference to FIGS. 1-3 and specifically FIG. 3, a garnish 104 can extend around the raised perimeter 68 of the stiffener 32 and can also be received in the electronic opening 62 and the outlet ports 48, 50. The garnish 104 accounts for any gaps between the opening 28 in the roof liner 22 and the stiffener 32 and provides a clean design surface for the interior cabin 20, thereby increasing the aesthetic value. The garnish 104 may be friction fit to the stiffener 32. The stiffener 32 may include holes 106 located near the raised perimeter 68 of the stiffener 32 to allow the stiffener 32 to attach to the roof liner 22. Further, the garnish 104 allows for variations in sizing between various stiffeners and their related roof liners, thereby reducing the possibility of increased labor expenses associated with mismatched parts.

Figure 5:
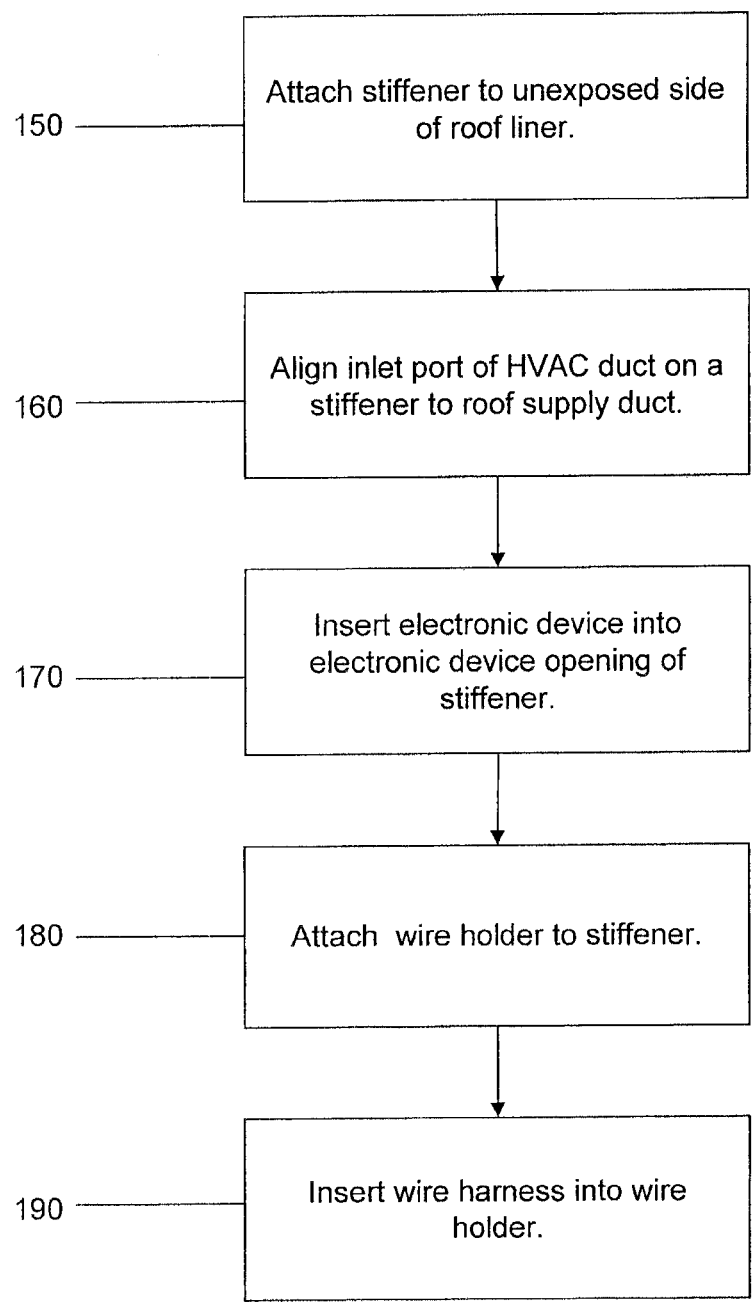
FIG. 5 is a flowchart illustrating a method of assembling an HVAC assembly.

With reference to FIG. 5, a method of assembling an HVAC outlet device 30 in a vehicle roof 14 is shown. The method is described with respect to the embodiment in FIGS. 1-4; however other stiffeners and HVAC components are contemplated. The following steps are described in logical order, but the appended claims are not limited to the order described. At 150, a stiffener 32 is attached to an unexposed side 26 of a roof liner 22 in a vehicle 12. As seen in FIG. 3, the lower surface 42 of the stiffener 32 contacts the unexposed side 26 of the roof liner 22. The stiffener 32 includes an integrally formed HVAC duct 46. At 160, an inlet port 58 of the HVAC duct 46 is aligned to a roof supply duct 56 in the vehicle roof 14 to allow fluid communication between the roof supply duct 56 and the HVAC duct 46. At 170, an electronic device 70 is inserted into an electronic device opening 64 of the stiffener 32 that is offset from the HVAC duct 46 in at least one of a lateral direction and a longitudinal direction of the vehicle 12. At 180, a wire holder 34 is attached to the stiffener 32. Further, at 190, a wire harness 100 is inserted into the wire holder 34. By employing an HVAC outlet device 30 including a stiffener 32 having an integrally formed HVAC duct 46 and an integrally formed electronic device opening 70, assembly time of this assembly is greatly reduced.

As used herein, terms such as "above . . . below . . . up . . . down . . . horizontally" are not intended to limit the appended claims, but are used for ease of description of the relationship of various parts of the illustrated embodiment, it being apparent that various orientations of a stiffener are possible depending upon the environments employed.

It will be appreciated that the above-disclosed and other features and functions, or alternatives or varieties thereof, may be desirably combined into many other different systems or applications. Also presently unforeseen or unanticipated alternatives, modifications, variations or improvements therein may be subsequently made by those skilled in the art which are also intended to be encompassed by the following claims.

The invention claimed is:

1. An HVAC assembly for a vehicle, comprising:
a roof liner including an exposed side that faces toward a cabin of the vehicle and an unexposed side that faces toward a roof of the vehicle, the roof liner including an opening formed therethrough; and
a stiffener including a base having an upper surface and a lower surface connected with the roof liner and contacting the unexposed side of the roof liner, wherein the stiffener at least substantially surrounds the opening for providing rigidity to the roof liner around the opening in the roof liner;
wherein the stiffener further includes an electronic device opening for receiving an associated electronic device and a wire holder for retaining a wire harness, wherein the wire harness delivers power to the associated electronic device;
wherein the stiffener further includes an integrally formed HVAC duct extending away from the unexposed side of the roof liner toward the roof of the vehicle,
wherein the stiffener further includes a stiffener connector disposed between the HVAC duct and the electronic device opening, wherein the stiffener connector includes sidewalls that cooperate with the base to define a cavity with an aperture for receipt of a fastener that attaches the stiffener with the vehicle.

2. The HVAC assembly of claim 1, wherein the electronic device opening and the wire holder are located adjacent an end of the stiffener that is opposite the HVAC duct.

3. The HVAC assembly of claim 1, wherein the electronic device opening is offset from the HVAC duct in at least one of a lateral and a longitudinal direction of the vehicle.

4. The HVAC assembly of claim 1, wherein the stiffener further includes an outlet attachment cooperating with a connection part associated with the electronic device to secure the electronic device in the electronic device opening, the outlet attachment being located adjacent the end of the stiffener that is opposite the HVAC duct.

* * * * *